(12) United States Patent
Barton et al.

(10) Patent No.: US 11,731,752 B1
(45) Date of Patent: Aug. 22, 2023

(54) REMOVABLE AIRCRAFT FUSELAGE EXPANSION WINDOW

(71) Applicants: Randy L. Barton, Fremont, NE (US); Tracy L. Ogle, Fremont, NE (US)

(72) Inventors: Randy L. Barton, Fremont, NE (US); Tracy L. Ogle, Fremont, NE (US)

(*) Notice: Subject to any disclaimer, the term of this patent is extended or adjusted under 35 U.S.C. 154(b) by 0 days.

(21) Appl. No.: 18/145,612

(22) Filed: Dec. 22, 2022

Related U.S. Application Data

(60) Provisional application No. 63/292,769, filed on Dec. 22, 2021.

(51) Int. Cl.
| | | |
|---|---|---|
| *B64C 1/32* | (2006.01) | |
| *B64C 1/14* | (2006.01) | |
| *E05C 9/08* | (2006.01) | |
| *B64D 25/08* | (2006.01) | |

(52) U.S. Cl.
CPC .............. *B64C 1/1484* (2013.01); *B64C 1/32* (2013.01); *B64D 25/08* (2013.01); *E05C 9/08* (2013.01)

(58) Field of Classification Search
CPC ....... B64C 1/1484; B64C 1/32; B64C 1/1492; B64C 1/1407; B64C 1/1423; B64C 1/1461; E05C 9/08; B64D 25/08
See application file for complete search history.

(56) References Cited

U.S. PATENT DOCUMENTS

| | | | | |
|---|---|---|---|---|
| 4,541,595 A | * | 9/1985 | Fiala ..................... | B64C 1/1492 292/87 |
| 5,271,581 A | * | 12/1993 | Irish ...................... | B64C 1/1492 52/208 |
| 5,826,824 A | * | 10/1998 | Martin .................... | B64C 1/32 49/141 |
| 6,027,073 A | * | 2/2000 | Gratien Ferrier ..... | B64C 1/1492 49/141 |
| 6,341,748 B1 | * | 1/2002 | Brooks ................. | B64C 1/1407 244/129.5 |
| 6,427,383 B1 | * | 8/2002 | Brooks .................... | E05C 9/00 49/141 |
| 9,097,039 B2 | * | 8/2015 | Bar ........................ | B60J 7/1642 |
| 10,202,184 B1 | * | 2/2019 | Bedus ................... | B64C 1/1492 |
| 10,240,373 B2 | * | 3/2019 | Amante .................. | E05C 9/046 |
| 10,807,706 B2 | * | 10/2020 | Joussellin ............. | B64C 1/1492 |
| 11,174,000 B2 | * | 11/2021 | Gorgoglione ......... | B64C 1/1492 |

(Continued)

*Primary Examiner* — Justin B Rephann
(74) *Attorney, Agent, or Firm* — Nasr Patent Law LLC; Faisal K. Abou-Nasr

(57) ABSTRACT

Aspects of this disclosure relate to a removable fuselage expansion window assembly, comprising: a window panel; an outer window frame; a window bracket configured to secure the window panel to the outer window frame; an inner window frame with an indented rim that is aligned with the window bracket; and a latch assembly located below the indented rim of the inner window frame between the outer window frame and the inner window frame. The latch assembly includes one or more retainers to hold a bottom portion of the removable fuselage expansion window assembly within a rectangular frame formed by vertical and horizontal beams in an outer wall of an aircraft, wherein the latch assembly includes a lever that releases the removable fuselage expansion window assembly by disengaging the one or more retainers from the rectangular frame when the lever is pulled.

20 Claims, 6 Drawing Sheets

(56) References Cited

U.S. PATENT DOCUMENTS

| | | | | |
|---|---|---|---|---|
| 2012/0085033 A1* | 4/2012 | Krahl | ................... | B64C 1/1492 49/141 |
| 2012/0227325 A1* | 9/2012 | Diamant | ................... | B60J 1/16 49/149 |
| 2014/0319276 A1* | 10/2014 | Yokoi | ................... | B64C 1/1492 244/129.3 |
| 2019/0233079 A1* | 8/2019 | Smith | ................... | B64C 27/04 |
| 2020/0317322 A1* | 10/2020 | Kovarik | ............... | B64C 1/1492 |

* cited by examiner

REMOVABLE AIRCRAFT FUSELAGE EXPANSION WINDOW

CROSS-REFERENCE TO RELATED APPLICATIONS

The present application claims priority under 35 U.S.C. § 119(e) to U.S. Provisional Application Ser. No. 63/292,769, filed Dec. 22, 2021, and titled "REMOVABLE AIRCRAFT FUSELAGE EXPANSION WINDOW," which is incorporated herein by reference in its entirety.

TECHNICAL FIELD

The present disclosure relates to aircraft window installations and/or modifications.

BACKGROUND

Some helicopters and other aircraft do not come equipped with windows that can be removed for emergency egress. To improve passenger safety, it would be beneficial to add emergency egress windows via aftermarket installations and/or modifications.

SUMMARY

Aspects of this disclosure generally relate to a removable fuselage expansion window assembly that can be installed to add an emergency egress window to an aircraft. In embodiments, the removable fuselage expansion window assembly includes: a window panel; an outer window frame with a first set of one or more retainers extending from a top portion of the outer window frame to hold a top portion of the removable fuselage expansion window assembly within a rectangular frame formed by vertical and horizontal beams in an outer wall of the aircraft; a window bracket configured to secure the window panel to the outer window frame; an inner window frame with an indented rim that is aligned with the window bracket; and a latch assembly located below the indented rim of the inner window frame between the outer window frame and the inner window frame. The latch assembly includes a second set of one or more retainers to hold a bottom portion of the removable fuselage expansion window assembly within the rectangular frame formed by the vertical and horizontal beams in the outer wall of the aircraft, wherein the latch assembly includes a lever that releases the removable fuselage expansion window assembly by disengaging the second set of one or more retainers from the rectangular frame when the lever is pulled, thereby providing an emergency exit or escape window for the aircraft.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is provided with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Reference will now be made in detail to the subject matter disclosed, which is illustrated in the accompanying drawings.

Figure 1:
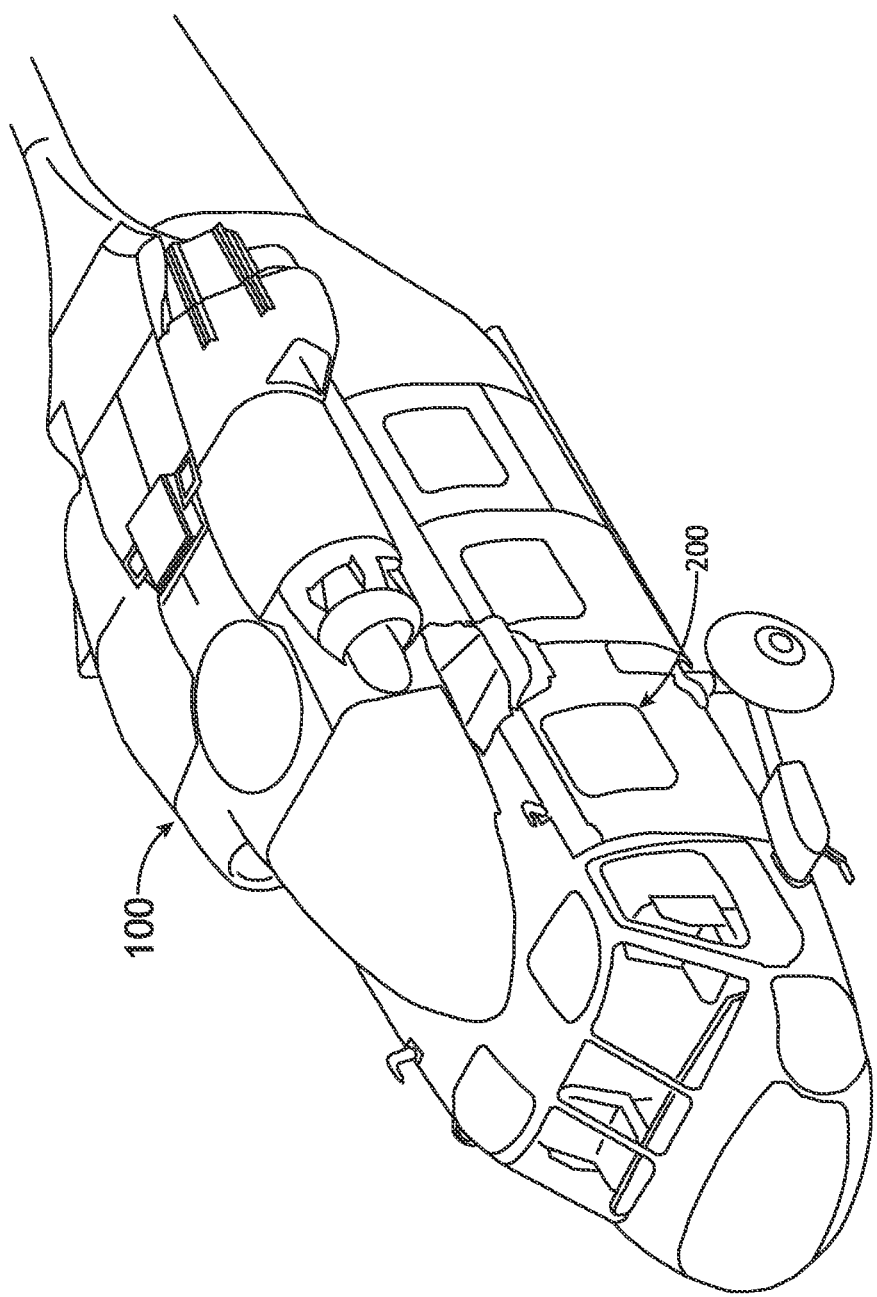
FIG. 1 illustrates an aircraft with a removable fuselage expansion window assembly, in accordance with an example embodiment of this disclosure.

FIGS. 1 through 6 illustrate embodiments of a removable fuselage expansion window assembly that can be installed to add an emergency egress window to an aircraft (e.g., a helicopter). For example, FIG. 1 illustrates an aircraft 100 with a removable fuselage expansion window assembly 200 installed, in accordance with an example embodiment of this disclosure. In the illustrated example embodiment, the fuselage expansion facilitates mission modification to the UH-60 Helicopter cabin interior allowing command/control and custom conversion to the base line aircraft. In other embodiments, the removable fuselage expansion window 200 may facilitate modification to other aircraft cabin interiors.

Figure 2:
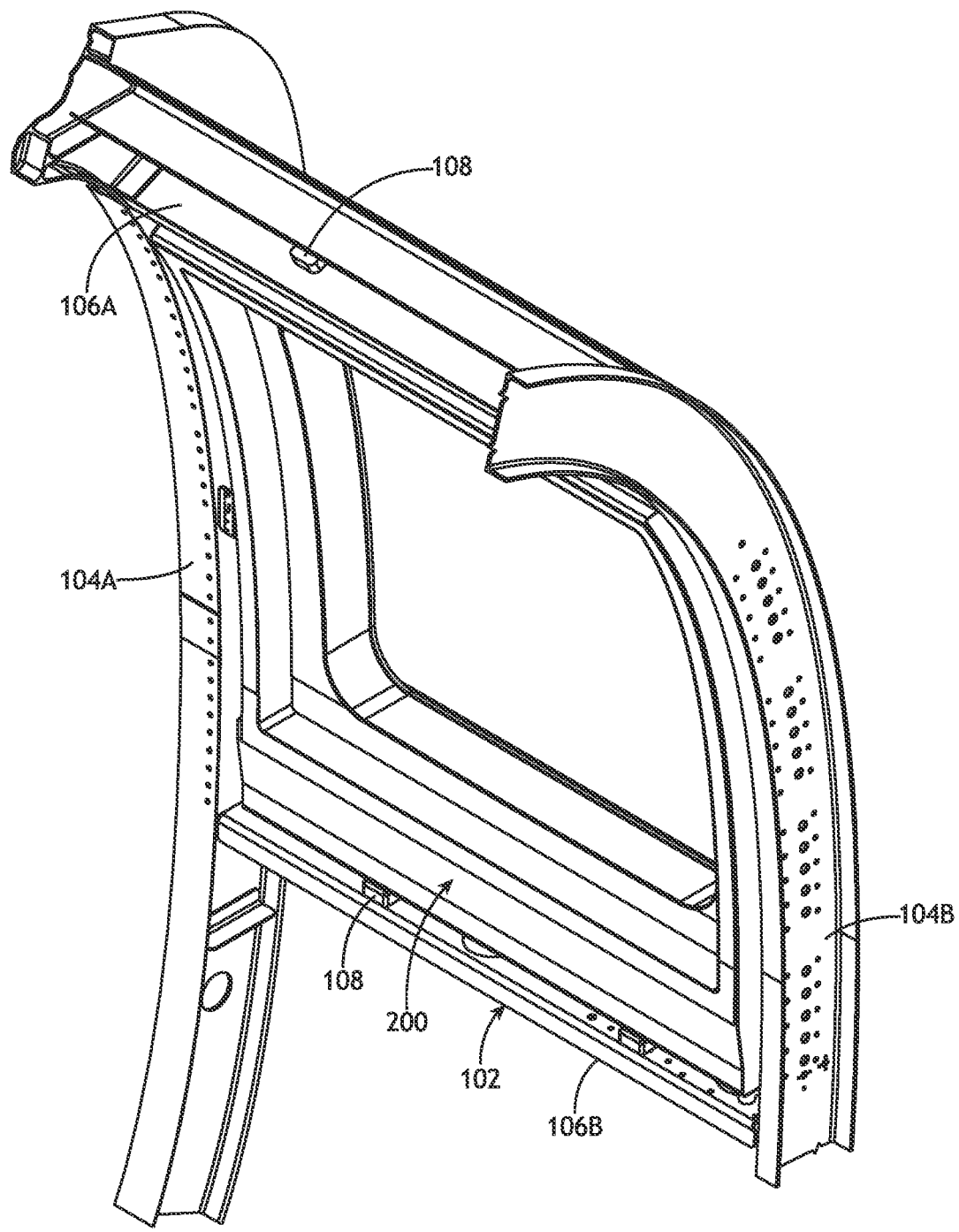
FIG. 2 is a perspective view of the removable fuselage expansion window assembly plugged into a rectangular frame defined by vertical and horizontal beams in the outer wall of the aircraft, in accordance with an example embodiment of this disclosure.

As shown in FIG. 2, the removable fuselage expansion window assembly 200 may be plugged into a rectangular frame 102 defined by vertical and horizontal beams in the outer wall of the aircraft 100. For example, the rectangular frame 102 may be formed by a left side vertical beam 104A, a right side vertical beam 104B, a top horizontal beam 106B, and a bottom horizontal beam 106B. In embodiments, the rectangular frame may include cooperatively shaped fittings 108 (e.g., sockets, slots, etc.) configured to engage with retainers (e.g., pins, clips, tabs, etc.) extending from portions of the removable fuselage window assembly 200. For example, the horizontal beams 106A and 106B of the rectangular frame 102 may include cooperatively shaped fittings 108.

In embodiments, the rectangular frame 102 is appropriately sized to meet emergency egress requirements. For example, the rectangular frame 102 may have a width of at least 19 inches and a height of at least 26 inches. This qualifies the removable fuselage window assembly 200 to be used as a Type IV Emergency Exit (19"×26") as long as there is seating for nine or less passengers. In some embodiments, the removable fuselage window assembly 200 can also be certified for ditching over water. The removable fuselage window assembly 200 may only qualify as an Escape Window for aircraft with seating of ten or more passengers (most likely with no ditching over water certification). Escape Windows should not be smaller than (19"×17"). As such, if the removable fuselage window assembly 200 is only to be configured as an Escape Window, the rectangular frame 102 may have a width of at least 19 inches and a height of at least 17 inches.

Figure 3:
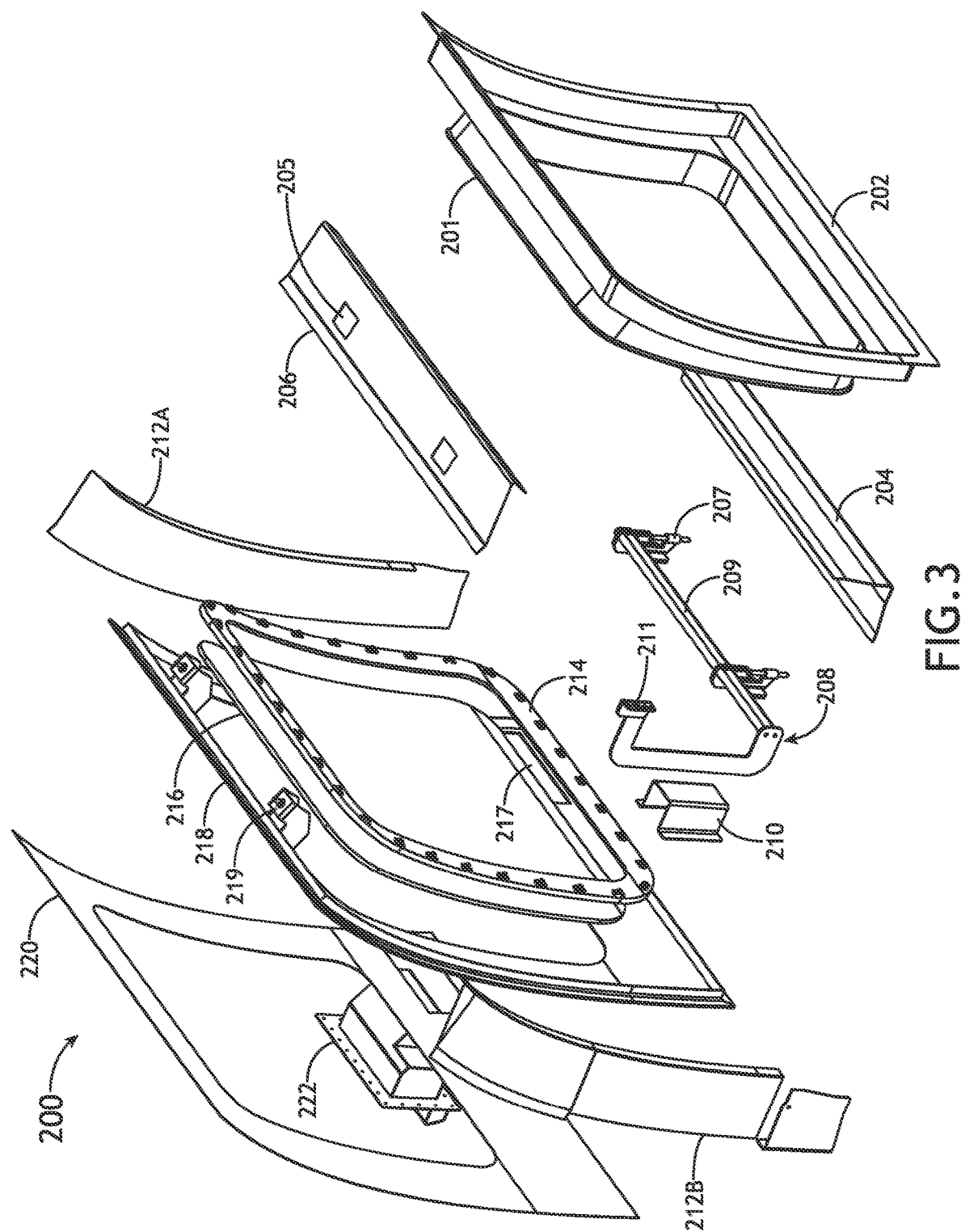
FIG. 3 is an exploded view of the removable fuselage expansion window assembly, in accordance with an example embodiment of this disclosure.

FIG. 3 is an exploded view of the removable fuselage expansion window assembly 200, in accordance with an example embodiment of this disclosure. As shown in FIG. 3, the removable fuselage expansion window assembly 200 includes a window panel 216 configured to be secured to an outer window frame 218. For example, the removable fuselage expansion window assembly 200 may include a window bracket 214 configured to secure the window panel 216 to the outer window frame 218.

In some embodiments, the outer window frame 218 includes a first set of one or more retainers 219 extending from a top portion of the outer window frame 218. These retainers 219 are configured to hold a top portion of the removable fuselage expansion window assembly 200 within the rectangular frame 102 formed by vertical and horizontal beams in the outer wall of the aircraft 100, as discussed above. For example, the first set of retainers 219 may be configured to engage with (e.g., insert into or attach to) one or more fittings 108 in the top horizontal beam 106A of the rectangular frame 102.

The removable fuselage expansion window assembly 200 further includes an inner window frame 202 with an indented rim 201 that is aligned with the window bracket 214. For example, the indented rim 201 may surround or overlap with the window bracket 214, or alternatively, the indented rim 201 may be surrounded by the window bracket 214.

A latch assembly 208 is located below the indented rim 201 of the inner window frame 202, between the outer window frame 218 and the inner window 202 frame. The latch assembly 208 includes a second set of one or more retainers 207 configured to hold a bottom portion of the removable fuselage expansion window assembly 200 within the rectangular frame 102 formed by the vertical and horizontal beams in the outer wall of the aircraft 100. For example, the second set of retainers 207 may be configured to engage with (e.g., insert into or attach to) one or more fittings 108 in the bottom horizontal beam 106B of the rectangular frame 102. The latch assembly 208 further includes a lever 211 that releases the removable fuselage expansion window assembly 200 by disengaging the second set of retainers 207 from the rectangular frame 102 when the lever 211 is pulled, thereby providing an emergency exit or escape window for the aircraft 100 (i.e., through the rectangular frame 102).

In some embodiments, the latch assembly 208 includes a bar 209 connected to the lever 211, and wherein the second set of retainers 207 are connected to the bar 209. Pulling the lever 211 causes the bar 209 to rotate about its longitudinal axis. This movement turns or pivots the second set of retainers 207 about the bar 209 so that the second set of retainers 207 become reoriented and consequently become disengaged from the fittings 108 in the bottom horizontal beam 106B of the rectangular frame 102.

The removable fuselage expansion window assembly 200 may further include a movement restrictor 210 located behind the lever 211 of the latch assembly 208 to prevent the lever 211 from being accidentally pushed forward so as not to accidentally release the removable fuselage expansion window assembly 200 from the rectangular frame 102 or render the lever 211 unreachable (e.g., stuck too far within a crevice between the removable fuselage expansion window assembly 200 and the rectangular frame 102). The movement restrictor 210 may comprise any structural element (e.g., a solid or hollow block, metal/plastic close out structure, etc.) placed behind the lever 211 to prevent its forward movement 211.

In some embodiments, the removable fuselage expansion window assembly 200 further includes two side members 212A and 212B, a base member 204, and a top member 206 that surround the outer window frame 218 and the inner window frame 202. These surrounding structures may also serve to secure or help hold the other components of the removable fuselage expansion window assembly 200 together. In embodiments, the top member 206 includes openings 205 for the first set of retainers 219 to be inserted through so that the retainers 219 stick out from the top of the top member 206 of the removable fuselage expansion window assembly 200. The base member 204 also includes a respective set of openings for the second set of retainers 207 to be inserted through so that the retainers 207 stick out from the bottom of the base member 204 of the removable fuselage expansion window assembly 200. The base member 204 may also have a raised edge that conceals most of the latch assembly 208. For example, the raised edge of the base member 204 may conceal all or most of the latch assembly 208 except for the lever 211 which must remain accessible.

The removable fuselage expansion window assembly 200 may further include a skin 220 that covers an outer surface of the outer window frame 208. The skin 220 may be the same as or similar to a skin that covers other portions of the aircraft fuselage. The skin 220 may include an opening for a step 222 located below the window panel 216 on the outside of the removable fuselage expansion window assembly 200. For example, the step 222 may be mounted within a small opening 217 in the outer window frame 218 that is located below the window panel opening.

Figure 4:
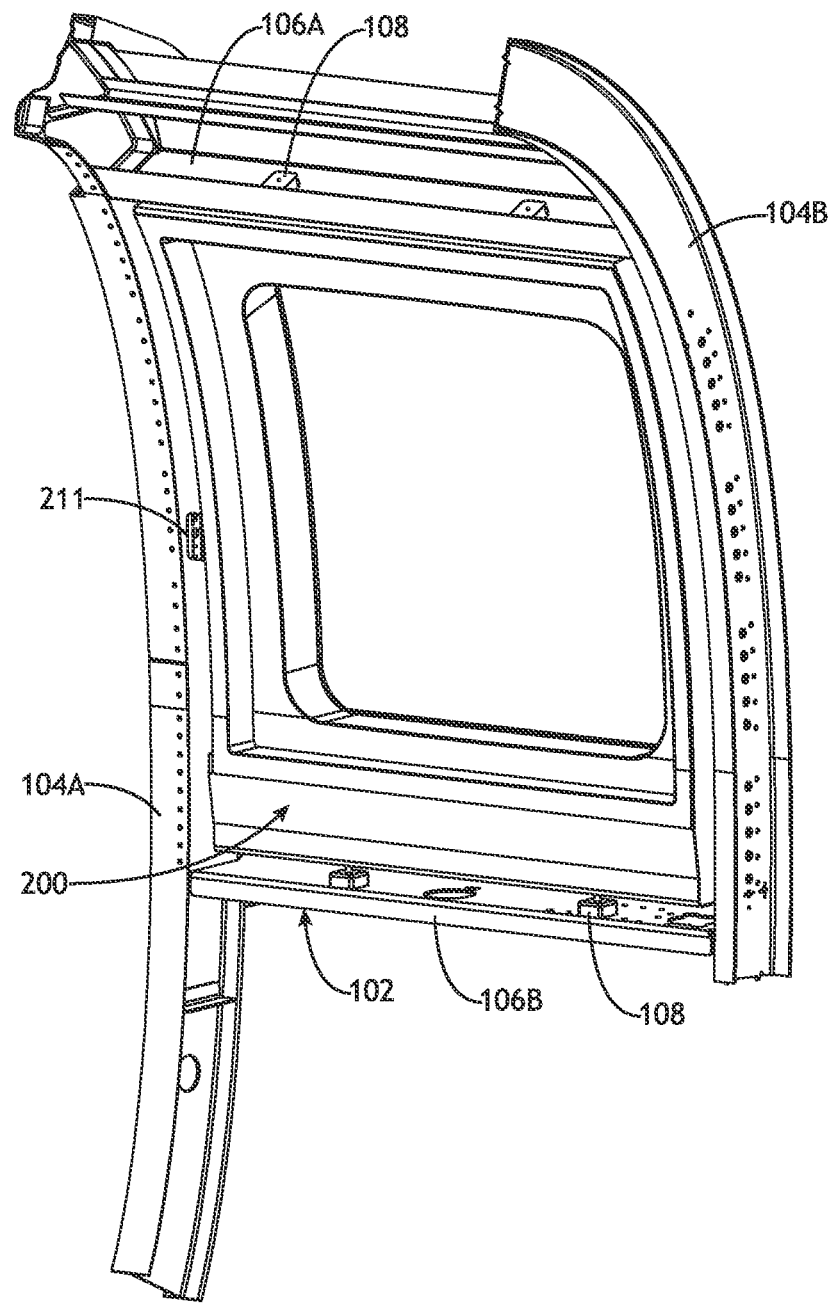
FIG. 4 is a perspective view of the removable fuselage expansion window assembly within the rectangular frame defined by vertical and horizontal beams in the outer wall of the aircraft, in accordance with an example embodiment of this disclosure.
Figure 5:
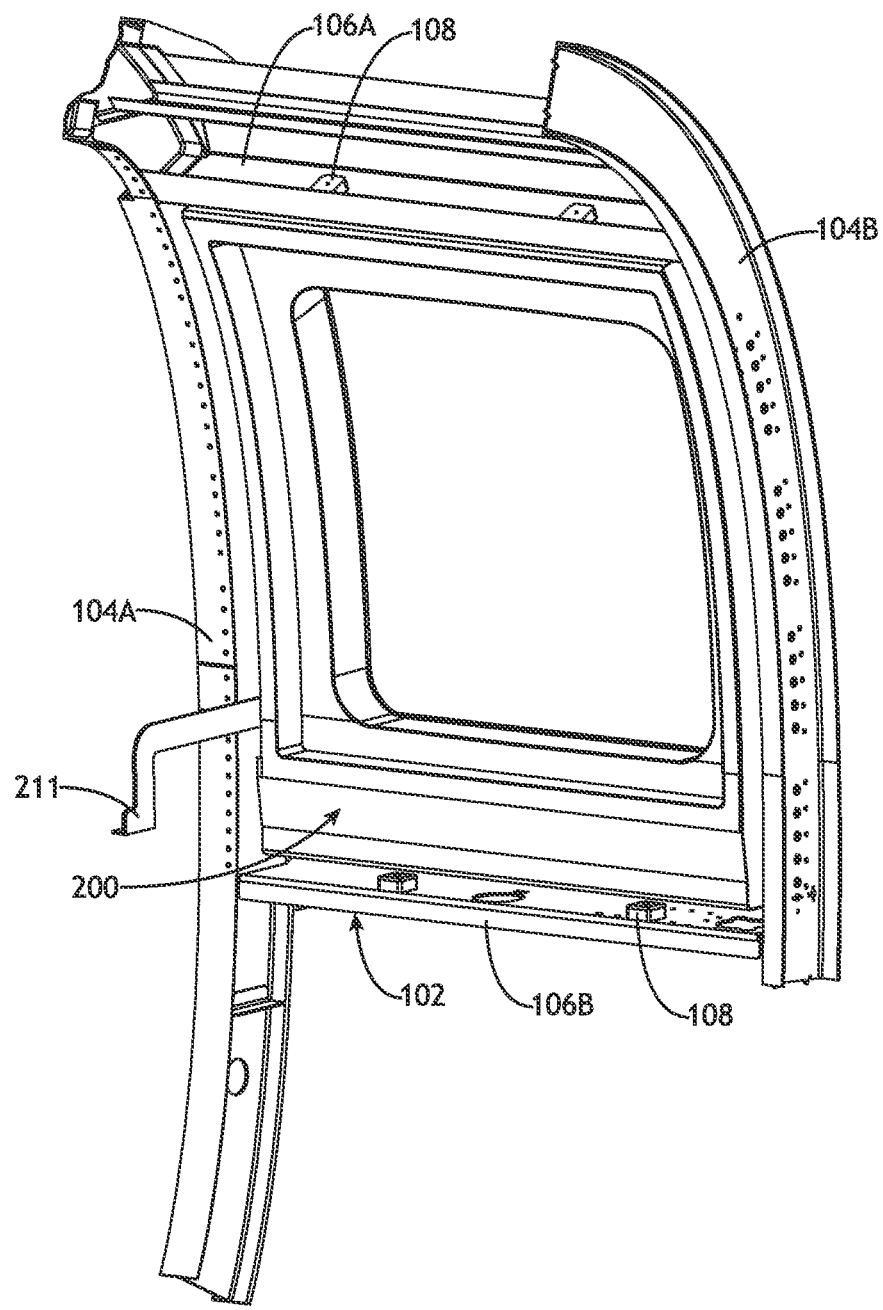
FIG. 5 is a perspective view of the removable fuselage expansion window assembly while pulling a lever that releases the removable fuselage expansion window assembly from the rectangular frame defined by vertical and horizontal beams in the outer wall of the aircraft, in accordance with an example embodiment of this disclosure.
Figure 6:
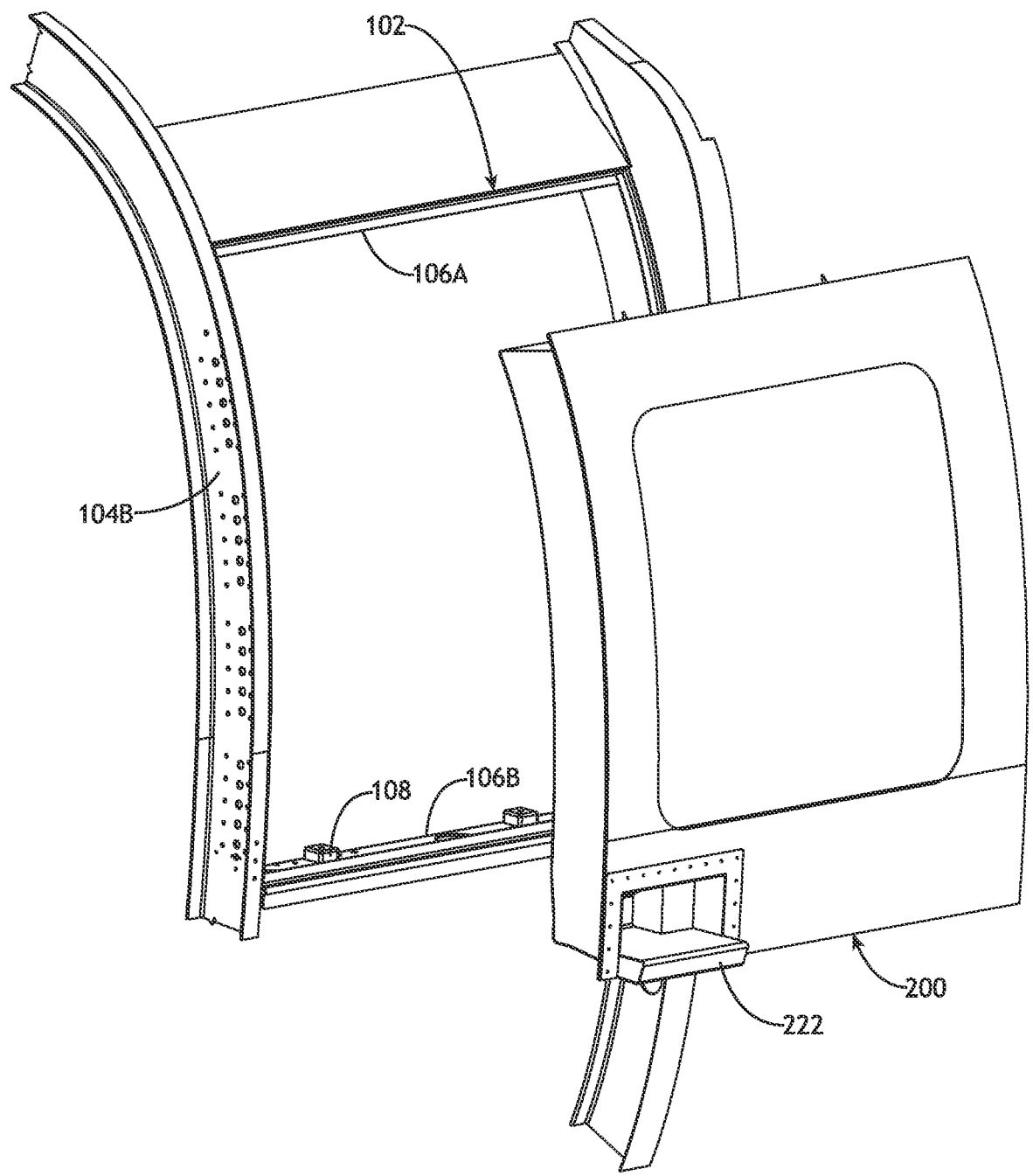
FIG. 6 is a perspective view of the removable fuselage expansion window assembly after releasing and jettisoning the removable fuselage expansion window assembly from the rectangular frame defined by vertical and horizontal beams in the outer wall of the aircraft, in accordance with an example embodiment of this disclosure.

An example process is illustrated in FIGS. 4 through 6 for jettisoning the removable fuselage expansion window assembly 200 from the rectangular frame 102 formed by rectangular frame 102 defined by vertical and horizontal beams (i.e., vertical beams 104A, 104B and horizontal beams 106A, 106B) in the outer wall of the aircraft 100. FIG. 4 shows the removable fuselage expansion window assembly 200 within the rectangular frame 102 in its normal installed configuration. FIG. 5 shows the lever 211 being pulled to release the removable fuselage expansion window assembly 200 from the rectangular frame 102 (i.e., by disengaging retainers 207 of the latch assembly 208 from cooperatively shaped fittings 108 of the bottom beam 106B of the rectangular frame 102). At this point, the removable fuselage expansion window assembly 200 can be pushed or kicked out to jettison the removable fuselage expansion window assembly 200 from the rectangular frame 102 (as shown in FIG. 6), thereby providing a means of egress for passengers onboard the aircraft 100.

Although the technology has been described with reference to the embodiments illustrated in the attached drawing figures, equivalents may be employed, and substitutions may be made herein without departing from the scope of the technology as recited in the claims. Components illustrated and described herein are examples of devices and components that may be used to implement the embodiments of the present invention and may be replaced with other devices and components without departing from the scope of the invention. Furthermore, any dimensions, degrees, and/or numerical ranges provided herein are to be understood as non-limiting examples unless otherwise specified in the claims.

What is claimed is:

1. A removable fuselage expansion window assembly for an aircraft, comprising:
    a window panel;
    an outer window frame with a first set of retainers extending from a top portion of the outer window frame to hold a top portion of the removable fuselage expansion window assembly within a rectangular frame formed by vertical and horizontal beams in an outer wall of the aircraft;
    a window bracket configured to secure the window panel to the outer window frame;
    an inner window frame with an indented rim that is aligned with the window bracket; and
    a latch assembly located below the indented rim of the inner window frame between the outer window frame and the inner window frame, the latch assembly including a second set of retainers to hold a bottom portion of the removable fuselage expansion window assembly within the rectangular frame formed by the vertical and horizontal beams in the outer wall of the aircraft, wherein the latch assembly includes a lever that releases the removable fuselage expansion window assembly by disengaging the second set of retainers from the rectangular frame when the lever is pulled.

2. The removable fuselage expansion window assembly of claim 1, wherein the latch assembly comprises a bar connected to the lever, and wherein the second set of retainers are connected to the bar.

3. The removable fuselage expansion window assembly of claim 1, further comprising a movement restrictor located behind the lever of the latch assembly to prevent the lever from being accidentally pushed forward.

4. The removable fuselage expansion window assembly of claim 1, further comprising two side members, a base member, and a top member that surround the outer window frame and the inner window frame.

5. The removable fuselage expansion window assembly of claim 4, wherein the top and base members include respective openings for the first set of retainers and the second set of retainers.

6. The removable fuselage expansion window assembly of claim 4, wherein the base member includes a raised edge that conceals most of the latch assembly.

7. The removable fuselage expansion window assembly of claim 1, further comprising a skin that covers an outer surface of the outer window frame.

8. The removable fuselage expansion window assembly of claim 1, further comprising a step located below the window panel.

9. The removable fuselage expansion window assembly of claim 8, wherein the step is mounted within an opening in the outer window frame.

10. An emergency egress window system for an aircraft, comprising:
    a rectangular frame formed by vertical and horizontal beams in an outer wall of the aircraft; and
    a removable fuselage expansion window assembly, comprising:
        a window panel;
        an outer window frame with a first set of retainers extending from a top portion of the outer window frame to hold a top portion of the removable fuselage expansion window assembly within the rectangular frame formed by the vertical and horizontal beams in the outer wall of the aircraft;
        a window bracket configured to secure the window panel to the outer window frame;
        an inner window frame with an indented rim that is aligned with the window bracket; and
        a latch assembly located below the indented rim of the inner window frame between the outer window frame and the inner window frame, the latch assembly including a second set of retainers to hold a bottom portion of the removable fuselage expansion window assembly within the rectangular frame formed by the vertical and horizontal beams in the outer wall of the aircraft, wherein the latch assembly includes a lever that releases the removable fuselage expansion window assembly by disengaging the second set of retainers from the rectangular frame when the lever is pulled.

11. The emergency egress window system of claim 10, wherein the latch assembly comprises a bar connected to the lever, and wherein the second set of retainers are connected to the bar.

12. The emergency egress window system of claim 10, wherein the removable fuselage expansion window assembly further comprises a movement restrictor located behind the lever of the latch assembly to prevent the lever from being accidentally pushed forward.

13. The emergency egress window system of claim 10, wherein the removable fuselage expansion window assembly further comprises two side members, a base member, and a top member that surround the outer window frame and the inner window frame.

14. The emergency egress window system of claim 13, wherein the top and base members include respective openings for the first set of retainers and the second set of retainers.

15. The emergency egress window system of claim 13, wherein the base member includes a raised edge that conceals most of the latch assembly.

16. The emergency egress window system of claim 10, wherein the removable fuselage expansion window assembly further comprises a skin that covers an outer surface of the outer window frame.

17. The emergency egress window system of claim 10, wherein the removable fuselage expansion window assembly further comprises a step located below the window panel.

18. The emergency egress window system of claim 17, wherein the step is mounted within an opening in the outer window frame.

19. The emergency egress window system of claim 10, wherein the horizontal beams of the rectangular frame include cooperatively shaped fittings configured to engage with the first set of retainers extending from the top portion of the outer window frame and the second set of retainers extending from the latch assembly.

20. The emergency egress window system of claim 10, wherein the rectangular frame has a width of at least 19 inches and a height of at least 26 inches.

\* \* \* \* \*